(12) United States Patent
Lawless et al.

(10) Patent No.: US 10,301,528 B1
(45) Date of Patent: May 28, 2019

(54) METHOD, APPARATUS, HEADER, AND COMPOSITION FOR GROUND HEAT EXCHANGE

(71) Applicant: Rygan Corp., Broken Arrow, OK (US)

(72) Inventors: Lane Lawless, Tulsa, OK (US); Michael Fraim, Corrales, NM (US); Brandon A. Larson, Dallas, TX (US)

(73) Assignee: RYGAN CORP., Broken Arrow, OK (US)

( * ) Notice: Subject to any disclaimer, the term of this patent is extended or adjusted under 35 U.S.C. 154(b) by 2 days.

(21) Appl. No.: 15/810,653

(22) Filed: Nov. 13, 2017

Related U.S. Application Data

(63) Continuation of application No. 12/720,052, filed on Mar. 9, 2010, now Pat. No. 9,816,023, which is a continuation-in-part of application No. 12/259,878, filed on Oct. 28, 2008, now Pat. No. 9,121,630.

(60) Provisional application No. 61/042,912, filed on Apr. 7, 2008, provisional application No. 61/158,556, filed on Mar. 9, 2009.

(51) Int. Cl.

| | |
|---|---|
| *F25J 3/08* | (2006.01) |
| *F28D 7/12* | (2006.01) |
| *C09K 8/467* | (2006.01) |
| *F28F 1/08* | (2006.01) |
| *F24T 10/17* | (2018.01) |

(Continued)

(52) U.S. Cl.
CPC .............. *C09K 8/467* (2013.01); *F24T 10/17* (2018.05); *F28F 1/08* (2013.01); *F24T 2010/53* (2018.05); *F28F 2013/006* (2013.01); *Y02E 10/125* (2013.01)

(58) Field of Classification Search
CPC .......... F24T 10/10; F24T 10/13; F24T 10/17; Y02E 10/12; Y02E 10/125; F28D 20/0043; F28D 20/0052; F28F 1/12; F28F 1/24; F28F 1/26
USPC .................................................... 165/45, 142
See application file for complete search history.

(56) References Cited

U.S. PATENT DOCUMENTS

| | | | | |
|---|---|---|---|---|
| 3,943,722 A | * | 3/1976 | Ross ....................... | E02D 3/115 405/130 |
| 4,286,651 A | * | 9/1981 | Steiger ..................... | E02D 5/24 165/45 |

(Continued)

FOREIGN PATENT DOCUMENTS

WO   WO-2006111655 A1 * 10/2006 ............. F24T 10/17

*Primary Examiner* — Jason N Thompson
(74) *Attorney, Agent, or Firm* — Dennis D. Brown; Brown Patent Law, P.L.L.C.

(57) ABSTRACT

A subterranean ground heat exchange system, a method of installation, and a grout composition therefor. The grout composition is a pumpable slurry formed of from about 70 to about 85 parts by weight natural flake graphite and from about 30 to about 15 parts by weight bentonite. The solids content of the pumpable grout slurry is preferably at least 35% by weight and is more preferably at least 40% by weight. The ground exchange apparatus preferably utilizes an improved supply and return header comprised of supply and return ports which are provided through the vertically extending outer wall of a header housing. The header also includes an interior supply conduit which extends from the supply port into the interior of the header housing and includes a bend positioned in the interior of the housing for directing the heat transfer fluid downwardly.

11 Claims, 10 Drawing Sheets

(51) Int. Cl.
F28F 13/00 (2006.01)
F24T 10/00 (2018.01)

(56) References Cited

U.S. PATENT DOCUMENTS

| | | | | |
|---|---|---|---|---|
| 4,328,858 A | * | 5/1982 | Richter | F24T 10/17 |
| | | | | 165/45 |
| 4,548,257 A | * | 10/1985 | Williamson | F28B 1/02 |
| | | | | 165/113 |
| 4,809,415 A | * | 3/1989 | Okayama | B21C 37/083 |
| | | | | 165/133 |
| 2005/0061472 A1 | * | 3/2005 | Guynn | F24J 3/083 |
| | | | | 165/45 |
| 2009/0084518 A1 | * | 4/2009 | Panula | F16L 9/19 |
| | | | | 165/45 |

* cited by examiner

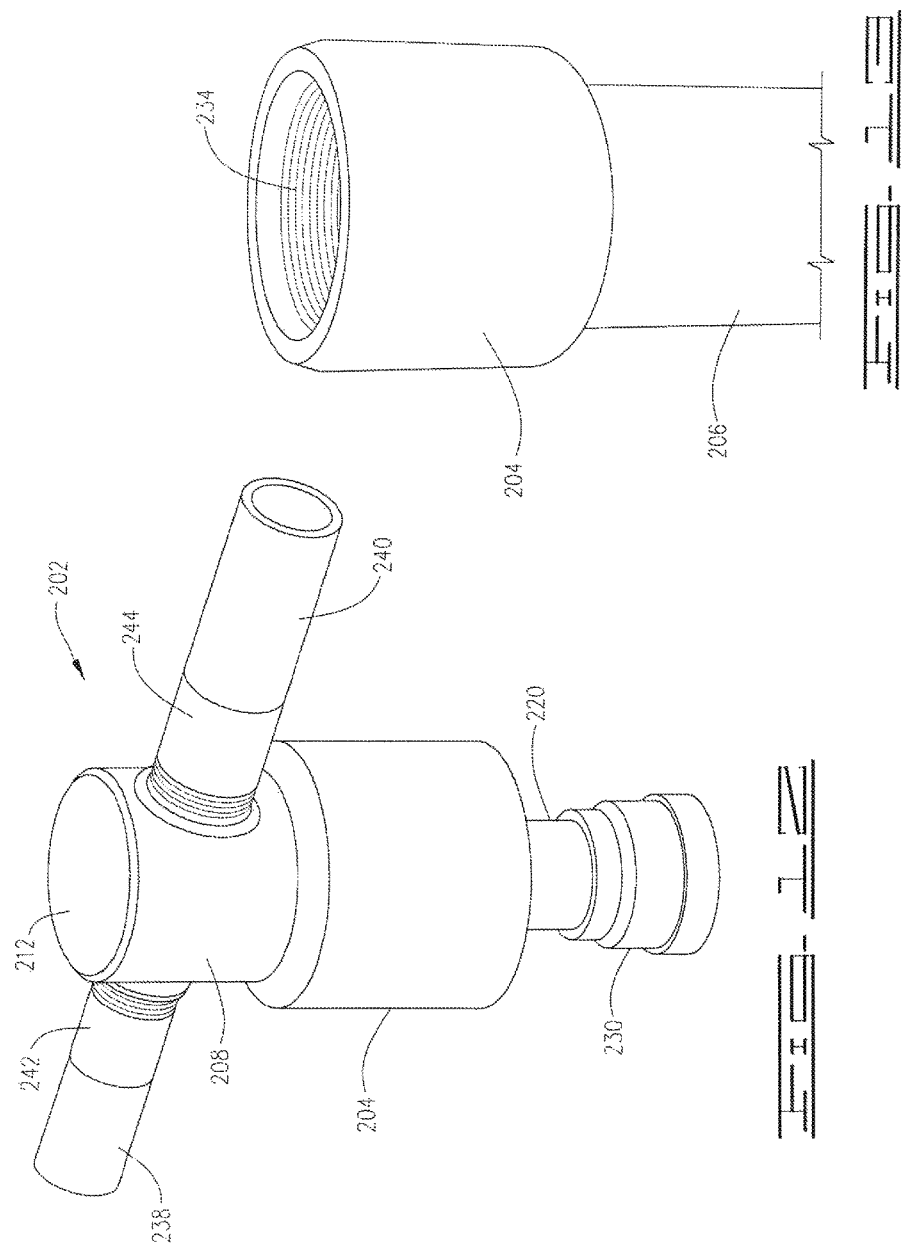

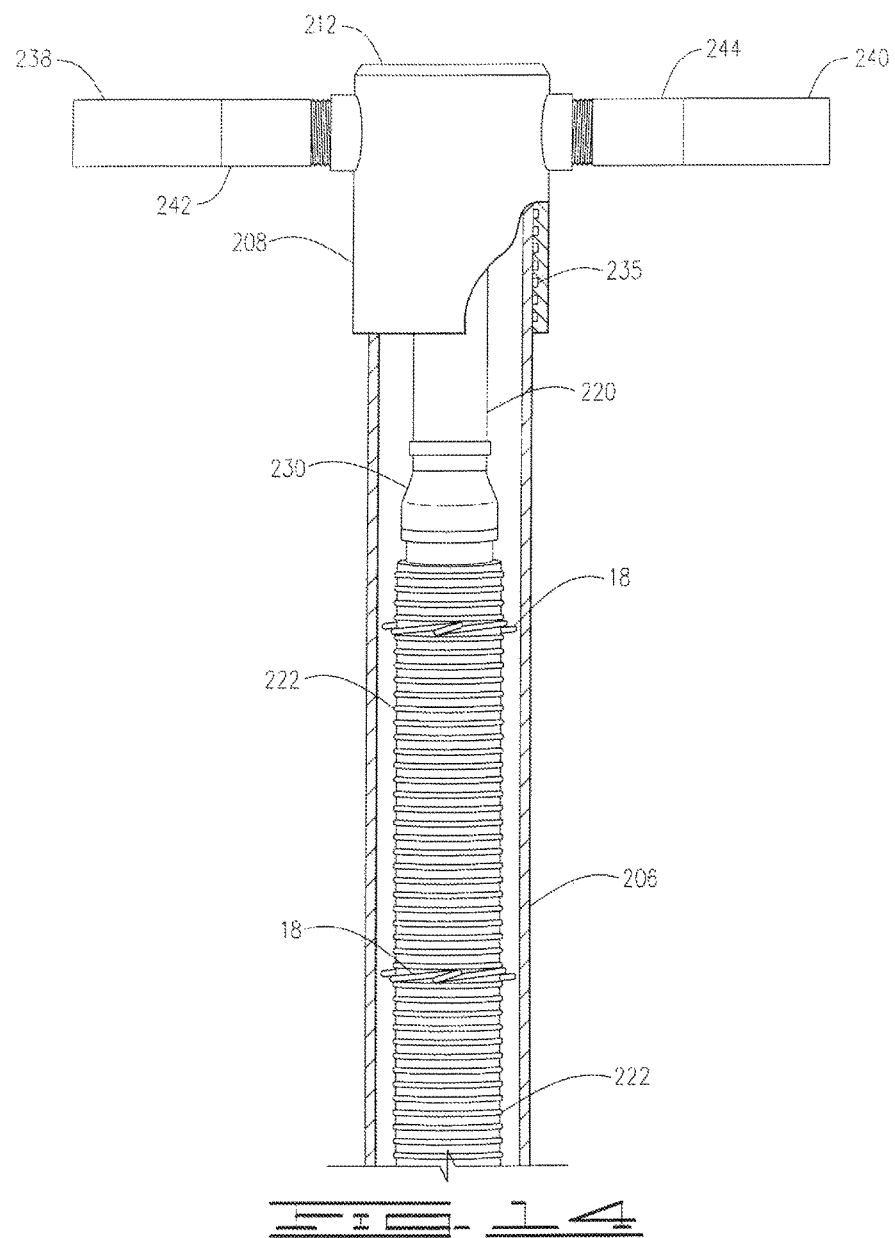

METHOD, APPARATUS, HEADER, AND COMPOSITION FOR GROUND HEAT EXCHANGE

This application is a continuation of co-pending U.S. patent application Ser. No. 12/720,052 filed Mar. 9, 2010, which is a continuation-in-part of U.S. patent application Ser. No. 12/259,878 filed Oct. 28, 2008 (now U.S. Pat. No. 9,121,630), which claims the benefit of U.S. Provisional Patent Application Ser. No. 61/042,912 filed Apr. 7, 2008. This application and U.S. application Ser. No. 12/720,052 also claim the benefit of U.S. Provisional Patent Application 61/158,556 filed Mar. 9, 2009.

FIELD OF THE INVENTION

This invention relates to the exchange of heat with the earth for heating, cooling and thermal energy storage applications. In one particular aspect, but not by way of limitation, the invention relates to cost effective materials, devices, systems, compositions, and methods which lower the thermal resistance between the working fluid (i.e., the heat exchange fluid) of a closed loop ground heat exchanger and the earth and to working fluid supply and return headers for concentric subterranean ground heat exchange systems.

BACKGROUND OF THE INVENTION

Ground heat exchangers provide more efficient heating and cooling of building spaces by exchanging heat based on the average yearly temperature of the soil and on a higher thermal conductivity of soil as compared to air. The relatively constant temperature of the earth provides a more favorable temperature gradient for heat transfer for both heating and cooling than conventional atmospheric air source systems because the atmospheric air experiences an average daily temperature swing of 20° F. and an average seasonal temperature swing of 80° F. on the North American continent. Heat is rejected to the earth by the heat exchange fluid when in the cooling mode and absorbed from the earth by the heat exchange fluid when in the heating mode. Ground heat exchange is synonymous with the terms geothermal, shallow geothermal, ground source and geoexchange when used in the context of subterranean heat exchange with the earth at the earth's ambient temperature.

Ground heat exchange systems can provide direct cooling or heating to a building space so long as an appropriate temperature gradient exists between the working fluid used in the system (e.g., water) and the earth and the ground loop is large enough to handle the heat load. The ground loop comprises the buried piping for the ground heat exchanger and for distribution of the working fluid. For most urban applications, a heat pump is also typically installed in the system to increase the thermal gradient to provide "on demand" efficient heating and cooling to a building space. The heat pump greatly increases the load capacity of the ground loop so that residential and business customers can afford the cost of installing the ground loop for their homes or businesses.

Various methods have been developed to exchange heat with the earth. Both vertical and horizontal pipe installations have been used to make subterranean ground loops. Experience has shown that horizontal loops are inefficient ground loops because the shallow depth of burial causes the ambient soil temperature to track the surface ground temperature. Horizontal loops buried below the frost line are, however, excellent for melting snow on pedestrian pathways and removing ice from bridges. Vertical ground loops can be open or closed. An open loop is where at least two wells are completed in a high productivity aquifer and water is circulated from one well to another. This method can be no longer used in urban areas due to drinking water safety standards enacted to prevent aquifer contamination.

The vertical closed ground loop heat exchanger uses piping inserted in a drilled hole in the ground. The configuration of the pipe loop is either side-by-side (U-tube) or concentric. The pipe loop can be made of metal or plastic. Initially, metal pipe loops were used in both concentric and U-tube installations to save capital cost, but experience has shown that metal pipe loop installations eventually fail due to anodic corrosion from conducting telluric or man-made electrical currents from one formation layer to another. Experience has also shown that plastic ground loop installations can last indefinitely, but the local ground temperature will heat up or cool down if the seasonal load is not balanced.

Currently, the most common type of vertical closed loop ground heat exchanger is a U-tube installation, which consists of inserting two lengths of high density polyethylene (HDPE) pipe, with a U-bend joint on the bottom, into a 4 to 6 inch diameter borehole. The borehole depth typically ranges from 150 to 400 feet deep into the earth. To prevent aquifer contamination, the bore hole is backfilled with impermeable grout formed of a high solids bentonite slurry or neat cement. The grout backfill keeps the piping in thermal contact with the wall of the borehole and provides a permeability barrier to reduce the vertical movement of ground water from one aquifer to another or to prevent surface water contamination of an aquifer.

The vertical, closed-loop, ground heat exchanger typically uses water or a water antifreeze mixture as a working thermal fluid. Refrigerants such as Freon® typically are not used due to expense and possible aquifer contamination. The water based fluid is circulated through the closed piping system, which consists of a distribution system to the vertical wellbores. The wellbore loop provides a downward path and an upward path that is arranged in either a U-tube or concentric pipe configuration. The U-tube configuration is about 30-60% as efficient as the concentric pipe configuration because, in the U-tube configuration, the returning fluid will reabsorb about 50% of the heat transfer to the ground on the way back up.

The concentric pipe configuration comprises a smaller diameter pipe arranged concentrically within a larger diameter outer pipe (i.e., the "casing"). The inside surface of the smaller diameter pipe provides a center flow channel and the annulus between the outer surface of the smaller diameter pipe and inner surface of the larger diameter pipe provides an annular flow channel. In most concentric pipe designs, the returning fluid should reabsorb less than 10% of the heat transferred to ground. Reference may be had to U.S. Pat. No. 4,574,875 "Heat Exchanger for Geothermal Heating and Cooling Systems" and US Patent Application Publication No. 20070029066 "Coaxial-Flow Heat Transfer Exchanging Structure for Installation in the Earth and Introducing Turbulence into the Flow of the Aqueous-Based Heat Transfer Fluid Flowing Along the Outer Flow Channel while Its Cross-Sectional Characteristics Produce Fluid Flows Therealong Having Optimal Vortex Characteristics that Optimize Heat Transfer with the Earth", which describe prior concentric piping designs.

The objective of the concentric pipe design is to maximize the heat exchanged between the bulk fluid in the annular flow channel and the earth. As illustrated in FIG. 3, for heat conduction to the earth, the heat must past through three thermal resistances: (1) the resistance 2 of the fluid boundary layer separating the bulk fluid and pipe wall; (2) the resistance 4 of the pipe material; and (3) the resistance 6 of the grout or slurry backfill. Heat loss can also occur between the center channel and annular channel, which reduces heat exchange with the earth. This undesirable condition is known as thermal short circuit. Minimizing thermal resistance between the bulk fluid and earth and maximizing thermal resistance between the center channel and the annular channel allows more heat to be exchanged for a given temperature gradient between the fluid and the earth. Prior U-tube designs have been particularly inadequate in minimizing thermal short circuit while prior concentric pipe designs have been particularly inadequate in minimizing thermal resistance of the grout and pipe wall.

Vertical, concentric-pipe, ground-loop, heat exchangers are also used as thermal banks for thermal energy storage applications. U-tube designs do not have enough water storage volume or high enough pulse heat transfer to make a thermal bank. Ground loops have greater thermal storage capacity than water tanks and they do not take up any valuable building space. For example, a heat pump can run at night to inject or remove heat from an isolated portion of a ground loop with cheaper electrical rates; then, during the day only a pump circulates fluid from the ground loop thermal bank to handle the heating and cooling loads of the building.

Minimizing the fluid boundary layer thermal resistance 2 requires: (1) maintaining separation between the smaller diameter pipe and the larger diameter pipe to prevent low flow zones in the annular channel and (2) preventing the development of laminar flow in the annular channel. The design in U.S. Pat. No. 4,574,875 disposes spacers (i.e., centralizers) periodically along the outer surface of the smaller diameter pipe to maintain alignment between the smaller diameter pipe and the larger diameter pipe (i.e., to assist in centralizing the smaller pipe within the larger pipe). The spacers have projecting spoke-type contacting fins which are also said to generate an amount of beneficial turbulence in the annular channel.

The design in US Patent Application Publication No. 20070029066 employs the method of disposing a helically-wrapped turbulence generator along the outer surface of the smaller diameter pipe to generate additional vorticity. Cost effectively manufacturing such a pipe with helical fliting disposed along the entire length of the outer surface has proven difficult and such fliting, and pipe, are easily damaged, making the flited pipe difficult to insert into a larger diameter pipe. Attaching the fliting as a separate piece to a smooth pipe makes the fliting susceptible to slipping along the outer surface of the pipe, which would allow the smaller diameter pipe to come in contact with the larger diameter pipe, thus creating low flow zones.

Minimizing the thermal resistance 4 of the larger diameter pipe requires using a material that: (1) has minimal wall thickness; (2) has enhanced thermal conductivity; (3) has sufficient mechanical strength to prevent collapse during installation; and (4) does not corrode in soil or degrade in antifreeze environments. Thermoplastic resins such as HDPE and PVC offer sufficient mechanical strength and corrosion resistance but they also have high thermal wall resistances that would classify them as thermal insulators. Metal pipe offers very low thermal resistance, but corrosion resistant alloys are very expensive, and their weight makes them more expensive to ship and more difficult to install. U.S. Pat. No. 4,574,875 prefers the use of plastic for the larger diameter pipe while US Patent Application Publication No. 20070029066 prefers the use of metal or a fluted plastic for the larger diameter pipe. Neither prior design addresses the mechanical strength of thin pipe walls as a function of bore depth.

Minimizing the backfill thermal resistance 6 requires a slurry composition that: (1) has enhanced thermal conductivity; (2) has low permeability; (3) has sufficiently long set times to allow deployment; (4) is environmentally safe with no organic leachate and less than 1 PPM for all metals as defined by a TCLP (Toxic Chemical Leaching Procedure); and (5) does not substantially dissipate in geologies with high groundwater flow. It is common practice to add silica sand to a bentonite and water slurry to enhance thermal conductivity to approximately 1.4 Btu/hr-ft-° F. Reference may be had to US Patent Application Publication No. 20070125274 "Thermally Conductive Grout for Geothermal Heat Pump Systems", which describes the use of graphite particles, ranging from 10 to 1000 microns in size, added to the slurry in concentrations from 2 to 25% by weight to produce a backfill with thermal conductivity greater than 4 W/m-K (2.3 Btu/hr-ft-° F.) that has lower permeability. The prior art is inadequate in providing details specifying a backfill composition that would be pumpable, would enable sufficiently long set times for deployment, and would resist dissipation due to high ground water flow rates. U.S. Pat. No. 4,574,875 does not address backfill composition and US Patent Application Publication No. 20070029066 prefers the use of thermally conductive cement but is not specific in backfill mixture composition, nor does it address permeability, environmental safety or dissipation.

Minimizing thermal short circuit requires that the center channel be sufficiently insulated from the annular channel to prevent significant heat flow between the channels. The design in U.S. Pat. No. 4,574,875 offers no solution while the design in US Patent Application Publication No. 20070029066 prefers relying on laminar flow in the center channel or using an insulating gas within the smaller diameter pipe, which are both impractical solutions to implement.

The designs in both U.S. Pat. No. 4,574,875 and US Patent Application Publication No. 20070029066 also fail to provide solutions that: (1) minimize pressure drop across the system; (2) prevent blockage of the center channel outlet; and (3) facilitate installation.

In addition to the above, further shortcomings and problems with existing concentric ground exchange assemblies arise due to the design of the heat transfer fluid supply and return headers currently used in these systems. A concentric ground exchange assembly 102 of a type heretofore known in the art is depicted in FIG. 8. The prior art assembly 102 comprises: an elongate outer casing string 104 which extends into the ground; a smaller diameter elongate inner pipe string 106 which extends downwardly inside the casing 104 such that a return flow annulus 108 is provided between the exterior of the inner conduit 106 and the interior wall of the casing 104; a plurality of centralizing elements or structures (not shown) which are positioned at intervals along the exterior of the inner conduit 106 for maintaining the inner conduit 106 in a substantially concentric alignment within the interior of the casing 104; an optional turbulence generating structure 110 (i.e., helical fliting) extending along the exterior of the inner conduit 106 for producing flow turbulence within the return flow annulus 108; and a heat transfer fluid supply and return header 112 secured at the upper end of the concentric ground exchange assembly 102.

The prior art concentric ground exchange assembly 102 will typically be installed in a vertical borehole which has been drilled to a depth in a range of from about 100 to about 500 feet and has a diameter in the range of from about five to about eight inches. As mentioned above, the concentric exchange assembly 102 is inserted into the borehole and the borehole is typically backfilled with a grout slurry composition which hardens to form a substantially impermeable grout barrier. The grout barrier prevents or at least reduces the vertical movement of ground water within the borehole and provides a heat transfer bridge between the exterior of the casing and the interior wall of the borehole.

The heat transfer working fluid employed in the concentric ground exchange assembly 102 will typically be either water or a mixture of water and antifreeze. Again, although refrigerants such as FREON® or other materials can alternatively be used, such materials are typically not employed due to the cost of materials and the danger of aquifer contamination.

During the operation of the concentric exchange assembly 102, the working fluid is delivered from a fluid supply line (not shown) to the inlet port 114 of the supply and return header 112. The supply line typically extends horizontally underground and is therefore often referred to as a "lateral." Moreover, as a consequence of the substantially horizontal orientation of the supply lateral, it is necessary that the header inlet include an elbow 115 which directs the fluid supplied to the inlet port 114 downwardly through the inner conduit 106. The fluid flows out of the lower end portion of the inner conduit 106 and is then directed upwardly through the return flow annulus 108 provided between the inner wall of the casing 104 and the exterior of the inner conduit 106. As the working fluid flows upwardly through the return flow annulus 108, the fluid is either heated or cooled by heat transfer with the earth and then discharged to a return line (lateral) (not shown) connected to the header discharge port 116.

Unfortunately, the supply and return header 112 used in the prior art concentric ground exchange assembly 102 has presented numerous problems and difficulties. The prior art supply and return header 112 comprises: a tall vertical inlet conduit 118 which includes the inlet elbow 115 at the top thereof and extends downwardly to the upper end of the inner conduit 106; a horizontally oriented connector 122 extending from the elbow 115 for connection of the working fluid supply line (lateral); an outer housing 124 provided around the lower exterior of the inlet conduit 118, below the elbow 115, for receiving fluid from the return flow annulus 108; a horizontal connector 126 extending from the outer housing 124 for attachment of the working fluid return line (lateral); a flange 128 provided at the lower end of the supply and return header 112 for attaching the header 112 to a corresponding flange 130 which must be installed on the upper end of the casing 104; a plurality of (typically 4) bolts 132 and associated nuts and washers for securing the header flange 128 on the casing flange 130; and a flange gasket 134 positioned between the header flange 128 and the casing flange 130.

In addition to other shortcomings, the underground flange connection required by the prior art supply and return header 112 is susceptible to significant leakage and other problems resulting from: (a) thermal contraction and expansion of the header material (typically high density polyethylene), (b) deterioration of the gasket 134 and/or the bolts 132 and associated nuts and washers, (c) the application of insufficient or excessive torque to the flange bolts 132 during installation, (d) torque created by surface vehicular loads, and/or (e) the loosening of the nuts and bolts over time. Moreover, due to its excessive height required for accommodating the inlet elbow configuration 115, the installation of the prior art supply and return header 112 requires a trenching depth of between 5 to 6 feet or more.

SUMMARY OF THE INVENTION

The present invention satisfies the needs and alleviates the problems discussed above. The invention provides a system, equipment, devices, compositions, and a method for subterranean ground heat exchange which minimize both (a) thermal short circuit and (b) the three thermal resistances between the working fluid and the earth, while also providing solutions to other problems not addressed in prior art.

In addition, the present invention provides an improved supply and return header and an improved concentric ground exchange assembly having the inventive supply and return header installed on the upper end thereof. The inventive supply and return header satisfies the needs and alleviates the problems discussed above by: (a) eliminating the flange connection to the casing required by the prior art header, (b) replacing the flange connection with a header skirt or collar which is chemically fused directly to the upper end of the casing; and (c) significantly reducing the height of the header to as little as ⅓ or less of the height of the prior art structure so that significantly less trenching and digging is required when installing the inventive system. The inventive supply and return header therefore has a much greater life, is much more reliable, is much better able to withstand surface vehicular loads, and is less costly and much easier to install.

In one aspect, there is provided a system, assembly, and method for low thermal resistance ground heat exchange between a working fluid and the earth. The system can be used for the heating and cooling of building spaces and can provide thermal energy storage. The system can be coupled to a heat pump or provide direct cooling by being coupled to a fluid cooler. The system preferably comprises: a low thermal resistance casing; a ribbed drop tube inserted into the casing; standoffs disposed on the exterior of the drop tube to maintain separation between the drop tube and the casing; an end cap to seal the bottom of the casing; and a header with supply and return ports. The system is preferably installed using an inventive, thermally conductive grout composition.

In another aspect, there is provided an apparatus and system for heating, cooling, and thermal energy storage using low thermal resistance ground heat exchange, the apparatus and system preferably comprising:

(a) an outer cylindrical, fiber-resin composite casing which provides a pressure boundary;

(b) a smaller diameter cylindrical drop tube arranged substantially concentrically within the cylindrical casing to create a center channel and an annular channel whereby the cross sectional area of the annular channel is preferably greater than cross sectional area of the center channel;

(c) the interior surface of the drop tube being smooth to minimize pressure drop and heat transfer along the center channel;

(d) the exterior surface of the drop tube being ribbed to create flow vortices and induce flow turbulence in the annulus to disrupt the thermal boundary layer on the interior casing surface to increase heat transfer to the earth;

(e) standoffs disposed along the outer surface of the drop tube such that the drop tube is substantially centralized in the casing, heat transfer is increased, and pressure drop is reduced;

(f) an end cap which seals the bottom of the casing; and (g) a header to seal the top of the casing, the header providing a port to connect the center channel to a supply line and a port to connect the annular channel to a return line.

In another aspect, there is provided a conduit for conductive heat transfer comprising a composite wall structure formed from a thermosetting plastic composition and a reinforcing fiber material, wherein: (a) a flow passageway extends through the composite wall structure; (b) the reinforcing fiber material is fiberglass, carbon fiber, aramid fiber, or a combination thereof; (c) the thermosetting plastic composition from which the composite wall structure is formed includes an amount of a thermal conductivity enhancing additive of at least 1.5% by weight based upon the total weight of the thermosetting plastic composition; and (d) the thermal conductivity enhancing additive is aluminum flake, aluminum powder, aluminum oxide, aluminum nitride, graphite, boron nitride, silicon carbide, Raney nickel, silver-coated nickel, silver-coated copper, or a combination thereof.

The inventive conduit can be used for conductive heat transfer and/or other purposes in numerous types of applications, exchangers, and systems. The inventive conduit is particularly well suited for use as a casing for any type of ground heat exchange system including, but not limited to, both U-tube and concentric exchanger configurations, as well as ground loops having any type of vertical, horizontal, angled, or deviated orientation.

In another aspect, there is provided a method of forming a conduit for conductive heat transfer. The method comprises the steps of: (a) applying a thermosetting epoxy composition to a continuous fiber material and (b) winding the continuous fiber material around a mandrel. The continuous fiber material is preferably fiberglass, carbon fiber, aramid fiber, or a combination thereof. The thermosetting epoxy composition includes an amount of medium grade aluminum powder in the range of from about 1.5% to about 8% by weight (more preferably at least 2% by weight) based upon the total weight of the thermosetting epoxy composition.

In another aspect, there is provided a method of subterranean ground heat exchange comprising the step of flowing a fluid medium through an underground casing such that thermal energy is conducted through a wall of the casing between the fluid medium and an underground environment surrounding the casing. The wall of the casing is a composite wall formed from a thermosetting plastic composition and a reinforcing fiber material wherein: (a) the reinforcing fiber material is fiberglass, carbon fiber, aramid fiber, or a combination thereof; (b) the thermosetting plastic composition from which the composite wall is formed includes an amount of a thermal conductivity enhancing additive of at least 1.5% by weight based upon the total weight of the thermosetting plastic composition; and (c) the thermal conductivity enhancing additive is aluminum flake, aluminum powder, aluminum oxide, aluminum nitride, graphite, boron nitride, silicon carbide, Raney nickel, silver-coated nickel, silver-coated copper, or a combination thereof.

In another aspect, there is provided a method of subterranean ground heat exchange comprising the step of flowing a fluid medium through a flow annulus in an underground casing such that thermal energy is conducted through a wall of the casing between the fluid medium and an underground environment outside of the casing. The flow annulus is formed between an interior wall of the casing and an internal conduit which extends into the casing. The internal conduit has a series of discrete, spaced-apart, radial ribs such that the series of ribs extends along an exterior of the internal conduit and such that the radial ribs project into the flow annulus toward the interior wall of the casing.

In another aspect, there is provided an apparatus for subterranean ground heat exchange comprising: (a) a casing which extends underground; (b) an internal delivery conduit extending into the casing for delivering a fluid medium to a distal end portion of the internal delivery conduit such that the fluid medium will flow from the distal end portion of the internal delivery conduit into a flow annulus formed between the internal delivery conduit and an interior wall of the casing; and (c) a series of discrete, spaced-apart, radial ribs wherein the series of ribs extends along an exterior of the internal delivery conduit such that the radial ribs project into the flow annulus.

In another aspect, the inventive system is installed using a novel backfill slurry composition. The composition preferably comprises bentonite (or cement), graphite and water such that the composition preferably has a solids content of at least 25% solids by weight. The slurry is used to backfill a borehole and provides a thermal communication path between the outer casing and the wall of the borehole (i.e., between the outer casing and the subterranean ground environment surrounding the casing). The graphite content is preferably an amount sufficient to provide a thermal conductivity of at least 3.0 Btu/hr-ft-F.

In another aspect, in order to further promote conductive heat transfer, it is also preferred concerning the novel casing used in the low thermal resistance ground heat exchange system that the casing be a thin-walled casing wherein: (a) the casing is preferably formed by embedding fiber or surrounding fiber in a thermosetting resin by applying the thermosetting resin composition to the fiber (e.g., by wetting the fiber in a thermosetting resin bath) and then winding the wetted fiber around a mandrel; (b) the large diameter cylindrical casing has a ratio of outer diameter to inner diameter that is less than 1.1; (c) the casing end cap is equipped with holes to allow a rope or wire to be threaded through the end cap to facilitate lowering the casing assembly into the bore; (d) the end cap is equipped with a check valve and cement float shoe to facilitate grouting by pumping down the casing: (e) flow ports with cumulative cross sectional area greater than cross sectional area of center channel are provided in or at a distal end portion of the center channel near the center channel outlet; and/or (f) the outer casing is constructed in segments of 15-30 feet with male threads at one end and female threads at the other end. If desired, the thermosetting resin composition can optional also include other additives such as, e.g., a standard wetting and dispersing agent to facilitate dispersion of the resin fillers and wetting out of the fiber and/or an air release additive to reduce entrapped air bubbles to increase heat transfer.

In another aspect, the backfill grout slurry dry base preferably comprises (a) at least 70 parts by weight (more preferably from about 75 to about 85 parts by weight) natural flake graphite, the natural graphite preferably having a particle size of less than 200 mesh, and (b) from about 15 to about 30 parts by weight (more preferably from about 25 to about 15 parts by weight) bentonite or Portland cement. However, by way of example, one alternative backfill slurry dry mix composition can comprise at least 70% by volume amorphous graphite, synthetic graphite, or coke and from about 2% to about 5% by volume calcium sulfate with the remaining volume being made up of sodium bentonite.

In another aspect, there is provided a grout slurry composition for conductive heat transfer applications, the grout slurry composition consisting essentially of: (a) a grout dry base composition consisting essentially of from about 70 to about 85 parts by weight natural flake graphite and from 30 to about 15 parts by weight of bentonite, Portland cement, or a combination thereof, and (b) an amount of water in the range of from about 8 to about 12 gallons for each 50 pounds of the grout dry base composition. The natural flake graphite preferably has a particle size effective for causing the natural flake graphite to remain in suspension in the grout slurry composition during use without any dispersant or other suspension assisting agent being present in the grout slurry composition.

In another aspect, it is also preferred concerning the novel low thermal resistance ground heat exchange system that: (a) the smaller diameter cylindrical drop tube have a ratio of outer diameter to inner diameter of at least 1.2 to mitigate thermal short circuiting; (b) the standoffs employed each have three loops constructed from one continuous wire and that the standoffs be open so that they can be clipped onto the drop tube; (c) an ultrasonic horn be pulled up the casing to instantly set the grout in the wellbore; and/or (d) the graphite enhanced cement mixture be used to provide structural support for the building piers and thermal conductivity for the ground heat exchanger.

The larger diameter cylindrical casing formed by the present invention minimizes thermal resistance and has sufficient crush and burst tolerance to be installed in depths of up to 500 ft or more. The novel cylindrical casing also resists corrosion when buried in the ground or when exposed to anti-freeze. In addition, the novel cylindrical casing preferably weighs less than 1 pound per foot and is preferably equipped with male and female threads for easy field assembly. Further, the above described thermosetting resin composition additives increase the thermal conductivity of the cylindrical outer casing. Also, the hole provided in the casing end cap allows a rope or wire to be threaded therethrough for lowering the assembled casing into the borehole. However the hole is formed and positioned such that it does not prevent the end cap from sealing the end of the casing.

In another aspect there is provided a grout slurry composition for conductive heat transfer applications comprising: (a) a dry base premixed composition consisting of from about 70 to 85 parts by weight natural flake graphite and from about 30 to about 15 parts by weight bentonite and (b) water in an amount of not more than 12 gallons for each 50 pounds of the dry base premixed composition. The natural flake graphite has a particle size of not greater than 200 mesh. The dry base premixed composition and water are preferably present in concentrations such that the grout slurry composition has a solids content of at least 35% by weight based upon the total weight of the grout slurry composition. In addition, the grout slurry composition preferably also comprises a thinning agent present in an amount such that the grout slurry composition is pumpable.

In another aspect there is provided a grout slurry composition comprising: from about 70 to about 85 parts by weight natural flake graphite; from about 30 to about 15 parts by weight of bentonite; water in an amount effective such that the grout slurry composition has a solids content of at least 30% by weight based on the total weight of the grout slurry composition; and a thinning agent. The thinning agent is preferably sodium chloride, potassium chloride, or a combination thereof and is present in the grout slurry composition in an amount effective such that the grout slurry composition is pumpable. The grout slurry composition more preferably has a solids content of at least 35% by weight solids and most preferably has a solids content of at least 40% by weight solids.

In another aspect there is provided a method of installing a casing of a subterranean ground heat exchange system. The method comprises the steps of: (a) placing the casing in a borehole; (b) forming a treated water by adding a thinning agent to water; (c) adding the treated water to a dry base composition to form a grout slurry; and (d) placing the grout slurry in an annulus between an interior wall of the borehole and an outer wall of the casing. The dry base composition consists essentially of from about 70 to about 85 parts by weight natural flake graphite and from 30 to about 15 parts by weight bentonite. The treated water is added to the dry base composition in an amount such that the grout slurry formed in step (c) has a solids content of at least 30% by weight based on the total weight of the grout slurry. The thinning agent is added to the water in step (b) in an amount effective to allow the grout slurry to be placed in the annulus in accordance with step (d) by pumping. The grout slurry more preferably has a solids content of at least 35% by weight and more preferably has a solids content of at least 40%/o by weight. The thinning agent is preferably sodium chloride, potassium chloride, or a combination thereof. In one embodiment, the grout slurry formed in step (c) and placed in the annulus by pumping in step (d) consists solely of the dry base composition, the water, and the thinning agent.

In another aspect there is provided an improvement for a subterranean ground heat exchange apparatus of the type comprising a casing extending underground, an internal delivery conduit extending into the casing, and a supply and return header mounted at an upper end of the casing for supplying a heat transfer fluid into the internal delivery conduit and for receiving the heat transfer fluid as it returns to the supply and return header via a return flow annulus between the internal delivery conduit and an interior wall of the casing. The improvement comprises an inventive supply and return header comprising: a housing having a closed top and a vertically extending outer wall which surrounds an interior of the housing, the closed top defining an upper end of the supply and return header; a supply port for the heat transfer fluid provided through the vertically extending outer wall; a return port for the heat transfer fluid provided through the vertically extending outer wall; and an interior supply conduit. The interior supply conduit includes a first portion thereof which extends into the interior of the housing from the supply port and has a bend which is positioned in the interior of the housing for directing the heat transfer fluid downwardly. The interior supply conduit also includes a second portion thereof which extends downwardly from the bend for delivering the heat transfer fluid to the internal delivery conduit of the ground heat exchange apparatus.

In another aspect, the inventive supply and return header used in the inventive improved ground heat exchange apparatus preferably has a height effective such that, when the inventive header is mounted on the upper end of the casing, the upper end of the supply and return header will not be more than 10 inches (more preferably not more than 8 inches, even more preferably not more than 7 inches, and most preferably not more than 6 inches) above the upper end of the casing.

In another aspect, there is provided a rubber or plastic drop tube that has ribs disposed along its outer surface to create flow vortices and induce flow turbulence in the annulus and cause the thermal boundary layer to restart along the casing inner wall.

In another aspect, there is provided a drop tube that resists corrosion and decomposition when exposed to antifreeze.

In another aspect, there is provided a drop tube that has a thermal conductivity value of less than 0.2 Btu/hr-ft-° F. to reduce thermal short circuiting.

In another aspect, there is provided a plastic or corrosion resistant metal standoff to maintain alignment between the drop tube and inner casing wall to prevent low flow zones.

In another aspect, there is provided a procedure wherein standoffs are placed in the drop tube corrugation valleys to prevent vertical movement along the drop tube.

In another aspect, there is provided a drop tube with a smooth inner surface to minimize pressure drop along the center channel.

In another aspect, there is provided a drop tube that has an outer diameter such that the cross sectional area of the annulus is preferably equal to or greater than that of the inner channel in order to minimize pressure drop in the annulus.

In another aspect, there is provided a drop tube having holes in or at the bottom end portion thereof to provide flow channels should the bottom end of the drop tube come in contact with the casing end cap. The holes preferably have a combined area equal to or greater than the center channel area to minimize pressure drop.

In another aspect, there is provided a slurry backfill composition that has thermal conductivity of preferably greater than 3.0 Btu/hr-F and permeability of preferably less than $1 \times 10^{-7}$ cm/s.

In another aspect, there is provided a grout composition that has a set time greater than one hour and that does not significantly dissipate in geologies with significant ground water flow.

In another aspect, there is provided a grout composition that will not contaminate the environment.

Further aspects, features and advantages of the present invention will be apparent to those of ordinary skill in the art upon examining the accompanying drawings and upon reading the following Detailed Description of the Preferred Embodiments.

BRIEF DESCRIPTION OF THE DRAWINGS

FIG. 6 also illustrates the drop tube 16 having a ribbed outer surface 40, a smooth inner surface 42, and standoffs 18 attached between ribs 44.

FIG. 12 is a perspective view of the inventive supply and return header 202 having the socket-to-thread adaptor 204 installed thereon.

FIG. 13 is an upper perspective view showing the socket-to-thread adaptor 204 received on and chemically bonded to the upper end of the casing 206.

FIG. 14 is a cutaway vertical view of a concentric ground heat exchange assembly using an alternative embodiment of the inventive supply and return header 202.

DETAILED DESCRIPTION OF PREFERRED EMBODIMENTS

Figure 1:
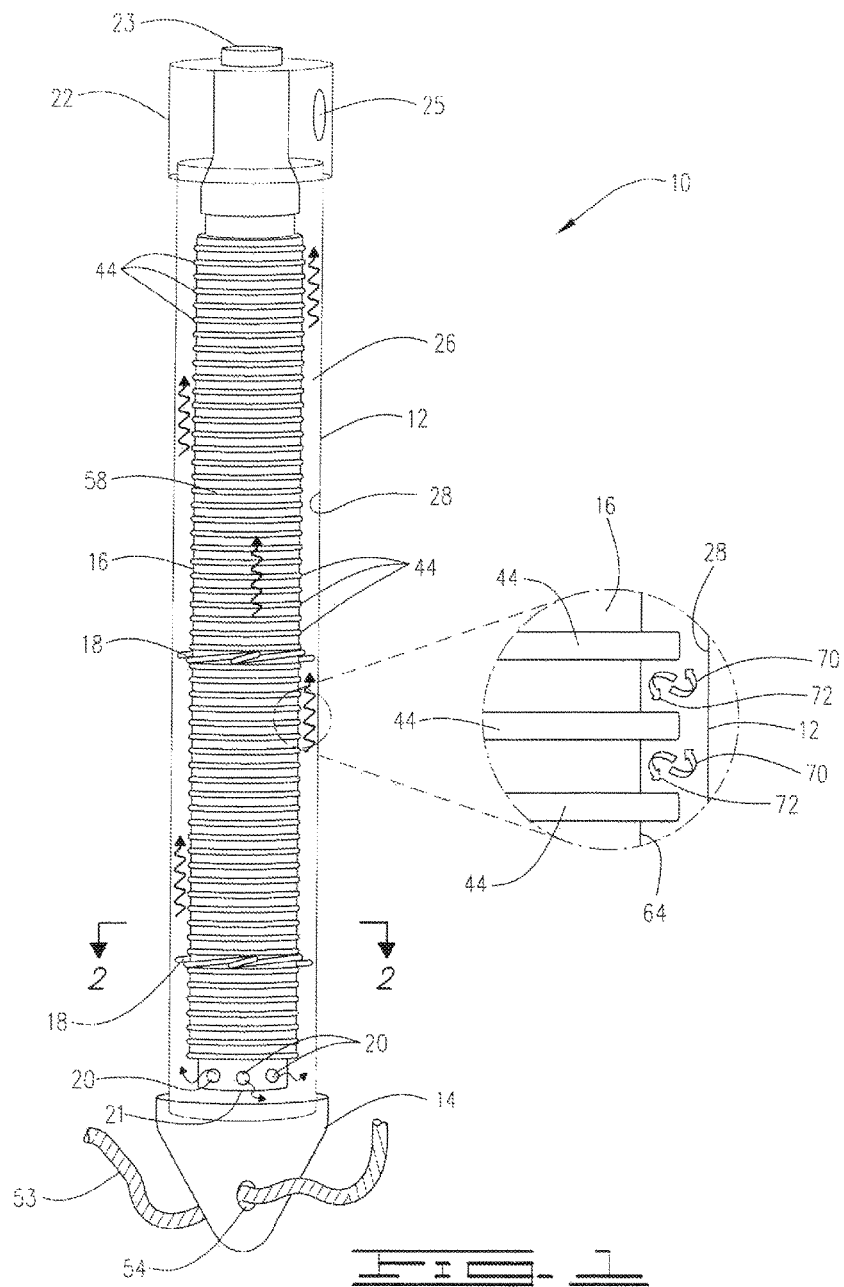
FIG. 1 is a vertical, partially cut-away view of an embodiment 10 of a mechanical assembly including an outer casing 12, an end cap 14, a ribbed drop tube 16 with standoffs 18 and flow ports 20, and a header 22 for connecting the tube center channel 24 to a supply line and connecting the annular channel 26 between the tube 16 and the inner wall 28 of the casing 12 to a return line.
Figure 2:
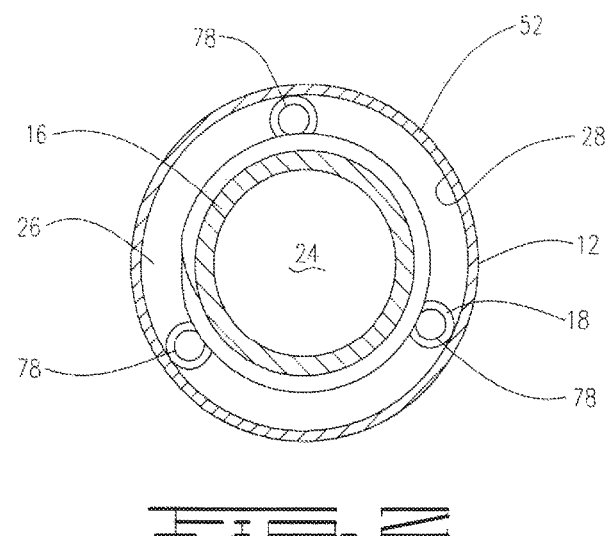
FIG. 2 is a cutaway cross-sectional view of the mechanical assembly 10 as seen from perspective 2-2 shown in FIG. 1.

A bore 11 of desired size, preferably measuring between about 5 to about 8 inches in diameter, is drilled vertically into the earth to a depth between from about 100 to about 500+ feet. The inventive mechanical assembly 10 shown in FIGS. 1 and 2 is installed in the borehole 11 and then the borehole 11 is backfilled with an aqueous grout slurry 15 preferably comprising natural flake graphite and a binding material such as bentonite or Portland cement. Alternatively, by way of example, amorphous graphite, bentonite, and calcium sulfate could be used. As is illustrated, the pressure boundary of the mechanical assembly 10 preferably comprises an outer (i.e., a larger diameter) cylindrical casing 12 capped at the bottom by an end cap 14 and at the top by a header 22 equipped with a supply port 23 and a return port 25.

A ribbed drop tube 16 of smaller diameter is inserted inside the casing 12 and aligned concentrically with (i.e., substantially centralized in) the casing 12 to create a center flow channel 24 and an annular flow channel 26. The supply port 23 connects the center flow channel 24 to a supply line and the return port 25 connects the annular flow channel 26 to a return line. The working fluid, which is preferably water or a water and antifreeze mixture, enters the mechanical assembly from the supply line, through the supply port 23, and travels down the center channel 24. The working fluid exits the center channel 24 through the drop tube outlet 21 at the lower end (i.e., distal end) of the drop tube 16 and through the flow ports 20. The flow ports 20 provide an alternative flow path in case the drop tube bottom outlet 21 comes in contact with the bottom of the casing. The working fluid then travels upward through the annular flow channel 26, then through the return port 25, and exits the mechanical assembly 10 to the return line.

Heat is exchanged between the earth 8 (i.e., the underground environment surrounding the casing 12) and the bulk fluid 5 flowing in the annular channel if a temperature gradient exists between the fluid 5 and earth 8. The bulk fluid 5 rejects heat (i.e., is cooled) when the temperature of the bulk fluid 5 is greater than the temperature of the earth 8. The bulk fluid 5 absorbs heat (i.e., is heated) when the temperature of the bulk fluid 5 is less than the temperature of the earth 8.

Figure 3:
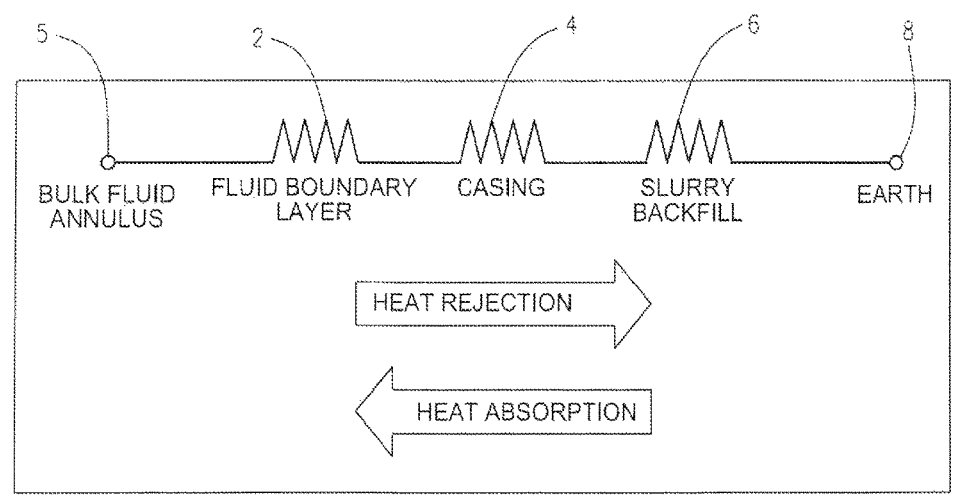
FIG. 3 illustrates the thermal resistance (fluid boundary layer 2, casing 4 and slurry backfill 6) between the bulk fluid 5 in the annular channel of a concentric geothermal exchange assembly and the earth 8.

As illustrated in FIG. 3, the heat exchanged between the earth 8 and the bulk fluid 5 flowing in the annular channel 26 must travel through three thermal resistances: the fluid boundary layer resistance 2; the casing resistance 4; and the slurry backfill (grout) resistance 6. To reject heat from the bulk fluid 5, the heat flows through the fluid boundary layer to the casing inner wall 28, then through the casing 12 and then through the slurry backfill 15. For the bulk fluid 5 to absorb heat, the heat flows through the slurry backfill 15, then through the casing 12 and then from the casing inner wall 46 to the bulk fluid 5 through the fluid boundary layer. The present invention provides practical materials and methods to reduce all three thermal resistances, thereby allowing greater heat exchange per unit length of the mechanical assembly 10 for a given temperature gradient. The present invention also provides a practical method to reduce thermal short circuiting between the center channel 24 and annular channel 26.

Figure 4:
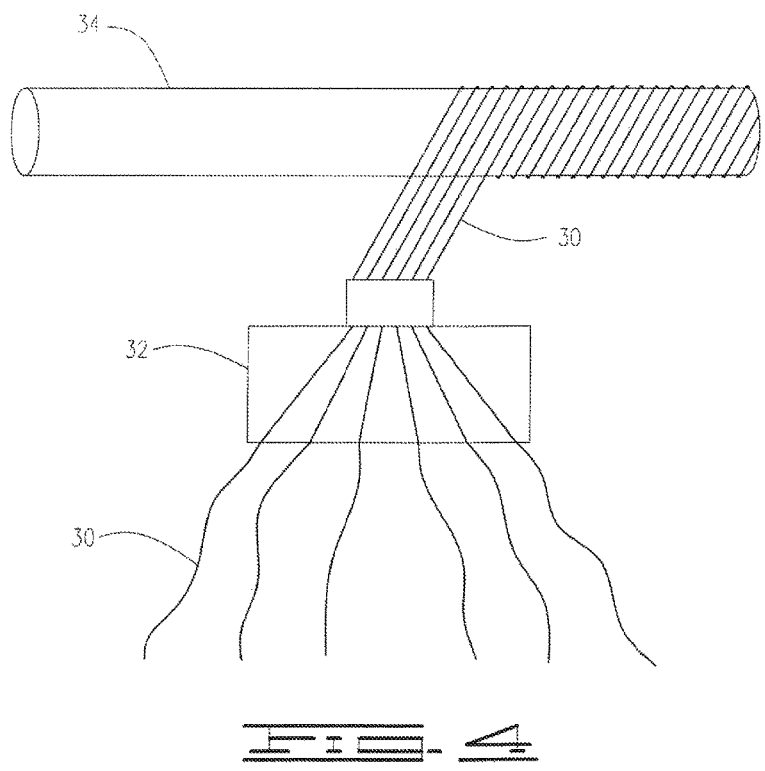
FIG. 4 illustrates an embodiment of an inventive process for forming the inventive casing 12 wherein fibers 30 wetted with thermosetting resin composition 32 are wound on mandrel 34.

As illustrated in FIG. 4, the present invention provides a novel conduit which is well suited for use as the outer cylindrical casing 12 for the system pressure boundary. However, the inventive conduit 12 is also well suited for use in other conductive heat transfer applications and can be formed in any desired cross-sectional shape. The inventive casing 12 is preferably formed by embedding fiber 30, or surrounding fiber 30, in a thermosetting resin by first wetting the fiber in a thermosetting resin bath 32, or otherwise applying the thermosetting plastic composition to the fiber 30, and then winding the wetted fiber 30 around a mandrel 34. The fibers 30, preferably made of glass, carbon or aramid (most preferably fiberglass direct-draw roving), impart directional strength to the material while the thermosetting resin 32 bonds the fibers 30 together and transfers stress between the fibers 30. The thermosetting plastic composition 32, which is preferably comprised of an epoxy base resin and an amine or anhydride curing agent, polymerizes to a permanently solid state upon the application of heat. An example of a preferred epoxy system is a two-part system comprising (a) an epoxy resin (e.g., FR-240 Epoxy Part A from Smith Fibercast or Dow DER 383 diglycidylether of bisphenol A) and (b) methylene dianiline or other curing agent (e.g., FR-204 Epoxy Part B from Smith Fibercast).

The thermosetting plastic composition 32 used for forming the inventive casing preferably comprises at least 1.5% (more preferably at least 2%) by weight, based on the total weight of the thermosetting plastic composition, of at least one additive such as graphite, aluminum flake, aluminum powder, aluminum oxide, aluminum nitride, boron nitride, silicon carbide, Raney nickel, silver-coated nickel or silver-coated copper to enhance thermal conductivity. As will be understood by those in the art, the resin mixture may also optionally contain other typical additives such as, for example, standard wetting and dispersing agents to facilitate dispersion of the resin and fillers and wetting out of the fiber and air release agents to reduce entrapped air bubbles.

The thermal conductivity additive used in forming the inventive casing conduit 12 is preferably aluminum powder. The thermal conductivity additive is most preferably a medium grade, dedusted, leafing aluminum flake powder having a $^+$325 mesh retention of not more than 2%. Although, pound for pound, carbon is more thermally conductive, it has been discovered in accordance with the present invention that the filament winding epoxy loading characteristics of aluminum powder, particularly when using the preferred medium grade powder, are of such a surprisingly superior and unexpected nature that much higher loadings of the aluminum powder providing greater thermal conductivities are achieved. Moreover, even at such high loadings, a desirably thin-walled yet unexpectedly strong pipe is produced and the viscosity of the epoxy system remains relatively low, thus speeding the pipe manufacturing process. Further, the aluminum powder additive is also readily available at reasonable cost.

The amount of the aluminum powder additive used in the thermosetting epoxy composition will preferably be in the range of from about 1.5 to about 8% by weight (more preferably at least 2% and most preferably about 2.6%) based on the total weight of the thermosetting epoxy composition 32. In addition, the thermosetting epoxy system composition will preferably further comprise an amount of an epoxy resin (i.e., the epoxy system Part A component) in the range of from about 77.8% to about 67.2% by weight and an amount of a curing agent (i.e., the epoxy system Part B component) in the range of from about 20.7% to about 17.8% by weight, all based on the total weight of the thermosetting epoxy composition.

In forming the casing 12, the wetted fibers 30 are preferably wound to produce a casing or other conduit 12 with a ratio of outer diameter to inner diameter of less than 1.1 in order to minimize thermal resistance, while still maintaining sufficient crush pressure (75 psi or more) and burst pressure (300 psi or more) for (a) vertical deployment to a depth of up to 300 ft. in conjunction with the use of the inventive backfill slurry preferably blended to a specific gravity of 1.4 or less and (b) vertical deployment up to 300 to 400 feet, or even up to 500$^+$ feet, when preferably using a backfill slurry with a specific gravity of 1.3 or less. The inventive casing is preferably less than 1 pound per foot for diameters up to 3.5 inches and does not corrode in soil or antifreeze environments.

Figure 5:
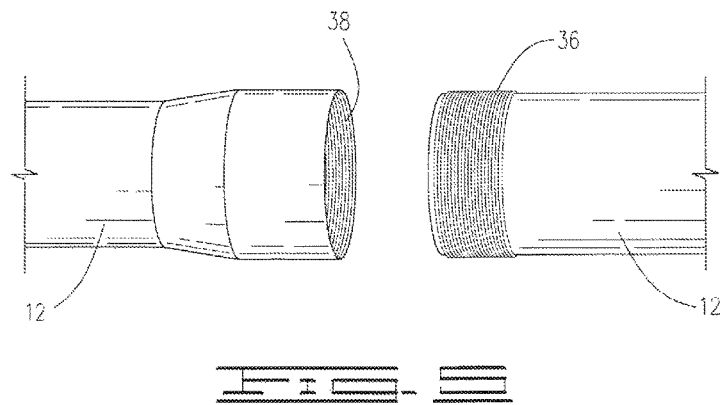
FIG. 5 shows an embodiment of the inventive casing 12 with male threads 36 and female threads 38.

As shown in FIG. 5, the casing 12 is preferably fashioned into manageable segments of about 15 to about 30 feet in length with one end having male threads (spigot end) 36 and the other end having female threads (bell end) 38, making the casing 12 easy to assemble. An epoxy adhesive is preferably placed on the male threads 36 during assembly to ensure a good mechanical seal.

Concerning the wall thickness of the inventive conduit 12, the wetted fiber 30 is more preferably wound on the mandrel 34 such that the ratio of the outside diameter to the inside diameter of the conduit 12 is not more than 1.055, most preferably not more than 1.04, with a collapse pressure of at least 75 psig. When used as a casing, the dimensions of the inventive conduit 12 will preferably be such that (a) the interior flow passageway 24 of the conduit 12 will be at least 9 inches in circumference and will more preferably be about 3.366 inches or more in diameter based upon the use of a 3.366$^+$ inch diameter forming mandrel 34 and (b) the conduit wall 52 will have a thickness of not more than 0.12 inch, more preferably not more than 0.085 inch and most preferably not more than 0.065 inch, while maintaining a collapse pressure of at least 75 psig.

As shown in FIG. 1, the present invention provides an end cap 14 that is preferably pressure molded from chopped fiber and thermosetting resin. A hole 54 through the end cap 14, preferably measuring approximately 0.5 inches in diameter, is provided to allow connection for a rope or wire 53 to facilitate lowering the casing assembly into the borehole 11. The end cap hole 54 is provided in such a manner as to not interfere with the casing seal provided by the end cap 14. The end cap 14 is preferably secured to the bottom casing segment using epoxy adhesive.

Figure 6:
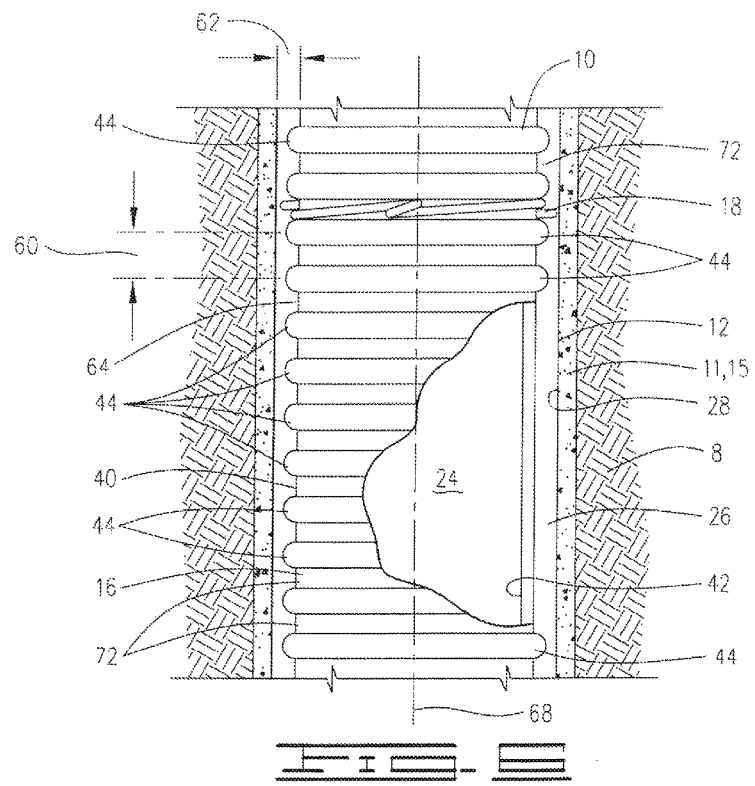
FIG. 6 is a partially cutaway sectional side view illustrating the mechanical assembly 10 installed underground in a vertical borehole 11.

As illustrated in FIG. 6, the present invention provides an inner cylindrical ribbed drop tube 16 that is preferably made from HDPE, PVC, or EPDM (i.e., a terpolymer elastomer produced from ethylene-propylene diene monomer) or any other rubber or plastic that is chemically resistant to common antifreeze additives such as methanol, ethanol, ethylene glycol and propylene glycol and that preferably has a thermal conductivity value less than 0.2 Btu/hr-ft-F. The drop tube 16 is a smaller diameter conduit which includes a series 58 of discrete, spaced apart, radial ribs 44, said series 58 of ribs 44 extending along the exterior of the drop tube 16 such that the radial ribs 44 project into the flow annulus 26 formed between the exterior of the drop tube 16 and the interior wall 28 of the casing 12. The radial ribs 44 are preferably circular in shape as shown in FIG. 2 and are preferably sized and spaced apart as shown in FIG. 1 such that, for each adjacent pair of ribs 44, the ratio of the peak-to-peak rib spacing 60 to the radial peak rib height 62 is in the range of from about 1.2:1 to about 3:1.

The ratio of the drop tube outer diameter (as measured between the ribs 44 at the point 64 of minimum tube thickness) to drop tube inner diameter will preferably be at least 1.2 to reduce thermal short circuiting between the center fluid delivery channel 24 of the drop tube 16 and the annular channel 26. The drop tube outer diameter is preferably sized such that, at the point 64 of the minimum tube thickness, the cross sectional area of the annular flow channel 26 is greater than the cross sectional area of the center channel 24 in order to minimize pressure drop along the annular channel 26.

The drop tube 16 is preferably a corrugated plastic or rubber tube. Such tubing is typically available on spools which makes it particularly convenient for installation and use in the inventive application. Because of the length of the tubing, few connections are needed for a given application. However, where necessary, sections of the corrugated tubing can be connected together mechanically using, e.g., plastic or stainless steel barbed connectors that are reinforced by applying bands on either end of the connection.

The drop tube inner surface 42 will preferably be smooth to reduce pressure drop along the center channel 24. The ribs 44 are preferably disposed along the outer surface of the drop tube 16 perpendicular to the longitudinal axis 68 of the drop tube 16 to create flow vortices 70 and induce flow turbulence in the annulus 26 and cause the thermal boundary layer to restart along the casing inner wall 28. However, the nature of the ribs 44 is such that the same turbulent flow conditions will not exist adjacent the drop tube 16 in the valleys 72 between the ribs, thus further reducing thermal short circuiting by not promoting the disruption of the fluid boundary layer on the exterior of the drop tube 16 at the points 64 of minimum tube thickness. The ribs 44 will preferably have a pitch in the range of from about 80 to about 90 degrees in order to assist in preventing the ribbed tube 16 from becoming deformed during shipping, packing, and installation.

As seen in FIG. 1, flow ports 20 are preferably provided at the lower end of the drop tube 16 to allow the fluid to exit the center channel 24 should the drop tube outlet 21 become blocked by the casing bottom. This may occur as the drop tube 16 elongates over time. The cumulative area of the flow ports 20 will preferably be greater than the cross sectional area of the center channel 24 to minimize pressure drop across the flow ports 20. The flow ports may be drilled through the side wall at the bottom portion of the drop tube 16 near the lower end 21. Alternatively, an insert 76 with flow ports 20 can be inserted into the drop tube outlet 21.

Figure 7:
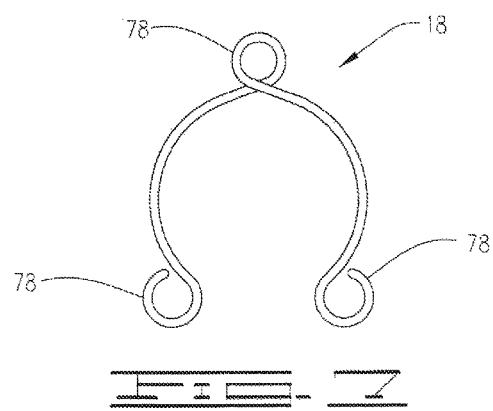
FIG. 7 shows an embodiment of an inventive standoff 18 used in accordance with the present invention.
Figure 8:
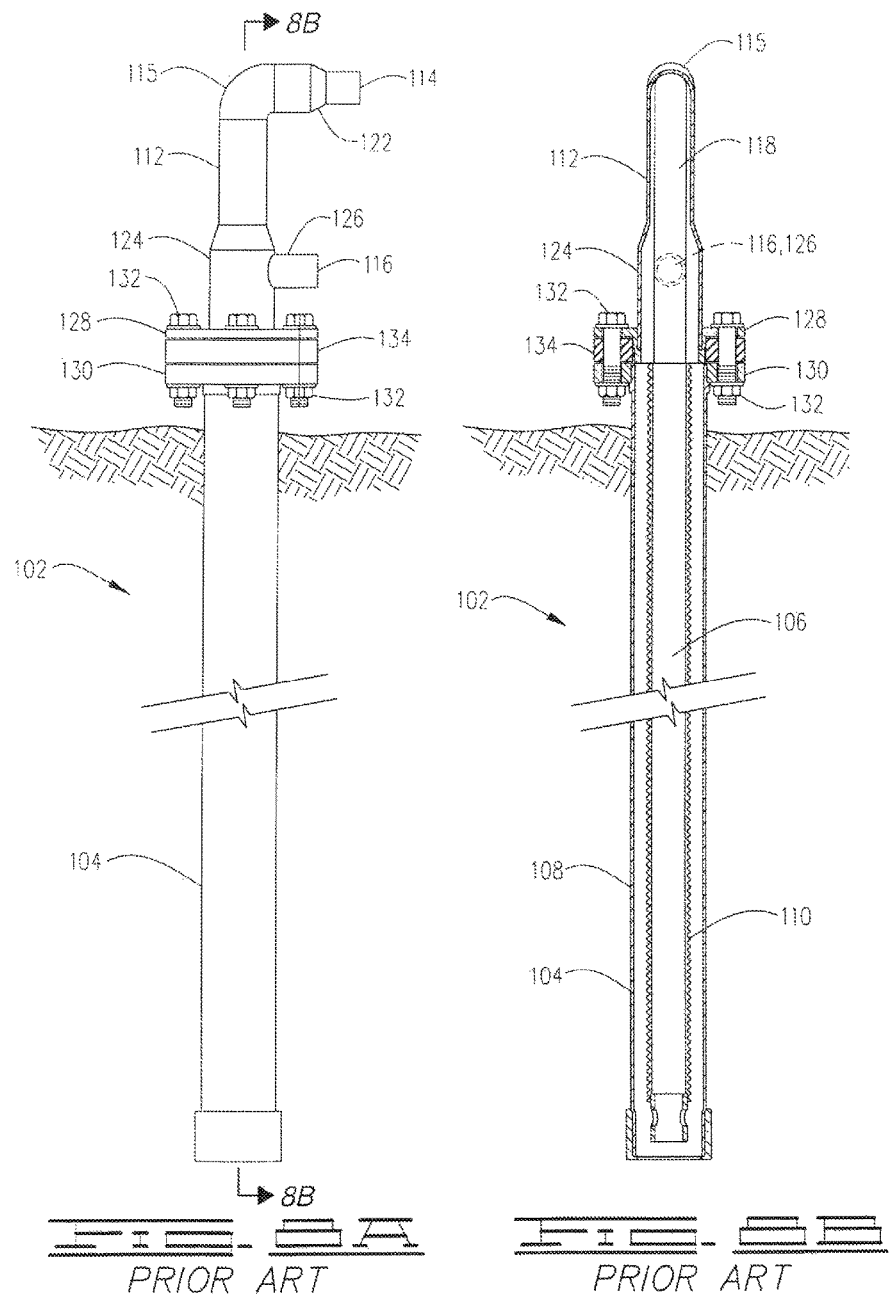
FIGS. 8A and 8B are exterior and a cutaway elevation views of a concentric ground heat exchange assembly 102 using a prior art supply and return header 112.

As illustrated in FIGS. 2, 6, and 7, the present invention provides plastic or corrosion resistant metal standoffs 18 that are clipped onto the exterior of the drop tube 16 between the ribs 44, preferably providing three points of contact between the drop tube 16 and the inner wall 28 of the outer casing. The ribs 44 prevent vertical movement of the clips 18 along the drop tube 16. The standoff contacts 78 are preferably in the shape of a loop, providing a rounded surface to minimize scoring of the inner casing wall 28 during insertion of the drop tube into the casing. The standoff 18 preferably has at least three contact loops 78.

The present invention also provides a thermally conductive, low permeability slurry backfill that is made from environmentally safe materials. The slurry is preferably made by mixing a dry base mixture with water in sufficient quantity to produce a slurry with at least 25% solids by weight. The dry base mixture preferably comprises, and more preferably consists essentially of or consists of, (a) natural flake graphite, amorphous graphite, synthetic graphite, or coke, and (b) bentonite or Portland cement.

Graphite enhances the conductivity of the slurry and the insoluble graphite particles provide a barrier to slow the vertical flow of water. Sodium bentonite, which is environmentally friendly clay, hydrates to fill the interstitial spaces of the graphite particles, further reducing permeability to less than $1 \times 10^{-7}$ cm/s. When using amorphous graphite, calcium sulfate, one of the more common minerals in sedimentary environments, preferably replaces 2-5% of sodium bentonite in the dry mixture to prevent dissipation of the backfill when the backfill is deployed in geologies with significant ground water flow.

In the case of amorphous graphite, the dry mix preferably comprises at least 70% amorphous graphite by volume with bentonite making up the remaining volume. Amorphous graphite, which is formed in the earth under intense heat and pressure, is inorganic, insoluble, and is virtually free of polyaromatics and metals.

In a particularly preferred embodiment, the inventive grout slurry comprises, and more preferably consists essentially of, (a) a dry base mix including, and more preferably consisting essentially of, from about 70 to about 85 (most preferably from about 75 to about 80) parts by weight (pbw) natural flake graphite and from about 30 to about 15 (most preferably from about 25 to about 20) pbw bentonite, Portland cement, or a combination thereof and (b) an amount of water in the range of from about 8 to about 12 (most preferably from about 9 to about 11) gallons per each 50 pounds of the dry mix. The resulting slurry has a solids concentration in the range of from about 45% to about 30% (most preferably from about 40% to about 35%) by weight. If high ground water flow is present, the composition of inventive grout slurry can be changed to also include up to 25 pounds of sands and/or up to 5 pounds of gypsum per each 50 pounds of the dry mix.

To assist in maintaining the flake graphite in suspension without the use of any dispersants, polymers, or other suspension assisting agents which can detract from the desirable thermal properties of the grout, and to also permit the incorporation of higher concentrations of graphite for significantly higher thermal conductivity, the particle size of the flake graphite used in the preferred grout slurry composition is preferably not greater than 200 mesh (0.074 mm). In addition, the grout slurry is preferably pumped into the borehole 11 around the outside of the casing 12 using a nonshearing pump (e.g., a positive displacement or diagram pump) and a tremmie pipe. The occurrence of shearing during the pumping process alters the slurry particle size and can increase the slurry viscosity.

The inventive slurry composition has a set time greater than one hour allowing sufficient time for deployment. The slurry is pumped into the borehole 11 through a hose and the borehole 11 is preferably filled with slurry from the bottom up to prevent bridging and voids. In situ, the backfill provides a thermal path from the outer casing 12 to the borehole wall. The grout backfill most preferably includes a sufficient amount of the thermal conductivity enhancing additive to provide a thermal conductivity of greater than 3 Btu/hr-ft-F.

In a particularly preferred embodiment, the grout backfill used in the present invention is prepared for pumping into the borehole by (a) dissolving a thinning agent in water to form a dilute treated water solution and then (b) adding a dry mix of any type discussed above to the dilute treated water solution to form a pumpable grout backfill slurry. The dry mix preferably comprises, and more preferably consists essentially of or consists solely of a pre-blended mixture of (a) from about 70% to about 85% by weight (more preferably about 70% to about 80% and most preferably about 75% by weight) natural flake graphite and (b) from about 30% to about 15% by weight (more preferably about 30% to about 20% and most preferably about 25% by weight) sodium bentonite. The natural flake graphite preferably has a particle size of not greater than 200 mesh and the sodium bentonite preferably has a particle size of not greater than 325 mesh, more preferably in the range of from 200 to 325 mesh.

The amount of thinning agent used in this embodiment for forming the dilute treated water solution is preferably an amount sufficient such that a pumpable slurry can be formed comprising, consisting essentially of, or more preferably consisting solely of (a) at least 30% by weight, more preferably from about 35% to about 45% by weight and most preferably about or at least 40% by weight of the dry mix and (b) not more than 70% by weight, more preferably from about 65% to about 55% by weight, and most preferably about or not more than 60% by weight of the dilute treated water solution.

The inventive grout slurry described above consisting solely of 75 parts by weight (pbw) natural flake graphite, 25 pbw sodium bentonite and sufficient water and NaCl thinning agent to provide a slurry solids content of at least 30% by weight will have a superior thermal conductivity when hardened. Moreover, the thermal conductivity of this inventive grout slurry will be further enhanced when blended to a slurry solids content of at least 35% by weight and will be even greater when blended to a slurry solids content of at least 40% by weight.

Examples of suitable thinning agents include, but are not limited to, sodium chloride, potassium chloride, and Aqua-Clear® PFD available from Baroid. If the thinning agent used is sodium chloride and/or potassium chloride, the dilute treated water solution will preferably comprise (and will more preferably consist essentially of and most preferably consist solely of) from about 8 to about 24 ounces by volume, more preferably from about 12 to about 20 ounces, of sodium chloride and/or potassium chloride per 9 gallons of water.

In the same way, Aqua-Clear® PFD will preferably be used in an amount of from about 5 to about 15 milliliters, more preferably from about 8 to about 10 milliliters, per 9 gallons of water. By way of example, the addition of 9 milliliters of Aqua-Clear® PFD per each 9 gallons of water provides a PFD concentration in the treated water of only 0.026% by volume.

In forming the preferred dry mix, the natural flake graphite and sodium bentonite components can be pre-blended in the appropriate ratio using a hopper and then poured into, e.g., 50 lb. sacks. By way of example, if no thinning agent is used, the addition of 12 gallons of untreated water to each 50 lb. sack of dry mix will produce a pumpable slurry having a solids content of about 30% by weight. In contrast, by using a thinning agent as discussed above, a pumpable slurry having a solids content of about 40% by weight can be produced using only 9 gallons of treated water per 50 lb. sack of dry mix.

As will be apparent, all slurry component ratios stated herein and in the claims relative to 50 lb. sack amounts of dry mix are equally applicable to slurry compositions containing less or more than 50 total pounds of dry mix. Thus, for example, the addition of 0.9 gallons of treated water to 5 lb. of dry mix is equivalent to and would be covered by any reference herein to the addition of treated water in an amount equivalent to 9 gallons of treated water per each 50 lbs. of dry mix.

When a preferred grout backfill slurry having a 40% solids context is pumped into the borehole outside of the casing, the slurry will settle in the annulus to a solids content of about 50% solids content after about six hours, thus greatly increasing the physical point-to-point contact between the grout carbon particles. This, in turn, provides a significantly enhanced level of thermal conductivity by allowing more phonons (infrared heat) to more easily move from one carbon particle to the next without having to jump across large insulating gaps formed of bentonite clay and bound water. Moreover, after about one month, the thinning agent will simply leach into the formation and the bentonite clay will swell by absorption of bound water to reduce the water permeability of the inventive grout backfill to near zero.

The thinning agent used in the present invention is preferably sodium chloride, potassium chloride, or a combination thereof, and is most preferably sodium chloride.

Example 1

A grout slurry was formed by adding 246 g of treated water (consisting of 240 g water and 6 g sodium chloride) to a dry mix consisting of (a) 120 g of natural flake graphite having a particle size passing (i.e., less than) 200 mesh and (b) 40 g of sodium bentonite having a particle size passing 325 mesh. The salt content of the treated water was thus 2.44% by weight (equivalent to about 1.88 lb. NaCl per 9 gallons of water) and the solids content of the slurry product composition was about 40% by weight. The slurry product was pumpable and had a specific gravity of 1.25. After setting overnight, a layer of water had begun to form on top of the slurry composition by the following morning.

Example 2

A grout slurry was formed by adding 152 g of treated water (consisting of 150 g water and 2 g sodium chloride) to a dry mix consisting of (a) 75 g of natural flake graphite having a particle size passing a 200 mesh screen and (b) 25 g of sodium bentonite having a particle size also passing a 200 mesh screen. The salt content of the treated water was thus 1.3% by weight (equivalent to 1 lb. of NaCl per 9 gallons of water) and the solids content of the slurry product composition was about 40% by weight. The slurry was more viscous, was not pumpable, was barely pourable, and had set up after one day. No water layer formed on the top of the composition.

Example 3

A grout slurry was formed by adding 154 g of treated water (consisting of 150 g water and 4 g sodium chloride) to a dry mix consisting of (a) 75 g of natural flake graphite having a particle size passing a 200 mesh screen and (b) 25 g of sodium bentonite having a particle size passing 200 mesh. The salt content of the treated water was thus 2.6% by weight (equivalent to 2 lb. NaCl per 9 gallons of water) and the solids content of the slurry product composition was about 40% by weight. The slurry product was pumpable. After one day, the slurry was thicker, but still pourable, and 4 to 5 g of water had formed on the top of the composition.

These examples illustrate the effectiveness of the use of a thinning agent in accordance with the present invention for forming and delivering the inventive grout backfill composition. In regard to the use of sodium chloride, potassium chloride, or a mixture thereof as the thinning agent, these examples particularly show the effectiveness of treated water compositions preferably consisting of from about 1.5% to about 3% by weight, more preferably about 2.44% by weight of sodium chloride and/or potassium chloride to form pumpable inventive grout slurry compositions having very high solids concentrations and excellent heat transfer characteristics.

Aqua-Clear® PFD, available from Baroid, is a liquid, phosphate-free, dispersant which comprises from 30 to 60% anionic polyacrylamide. Aqua-Clear® PFD has a pH of 6.5-7.5, a specific gravity of 1.2-1.4 at 20° C., and is partially soluble in water. In contrast to the surprising new use thereof discovered in accordance with the present invention, Aqua-Clear® PFD has heretofore only been used, to our knowledge, at a concentration of 0.2% by volume in water (i.e., almost an order of magnitude higher than the present invention) for (a) dispersing mud, sediment, and clay from producing formations and gravel packs and (b) reducing the viscosity and gel strength of drilling fluids.

Figure 9:
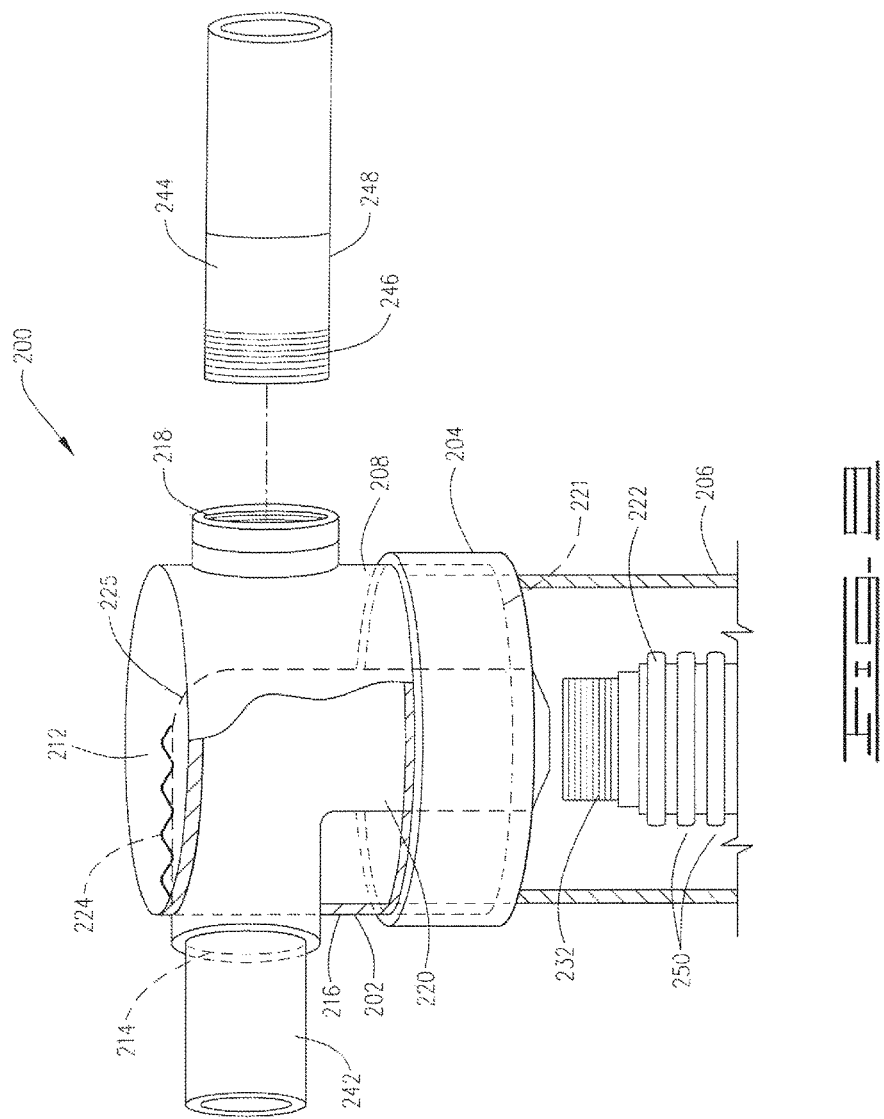
FIG. 9 is a schematic elevational cutaway side view of the upper end of an inventive concentric ground heat exchange assembly 200 having an embodiment 202 of the inventive supply and return header installed on the upper end thereof.
Figure 10:
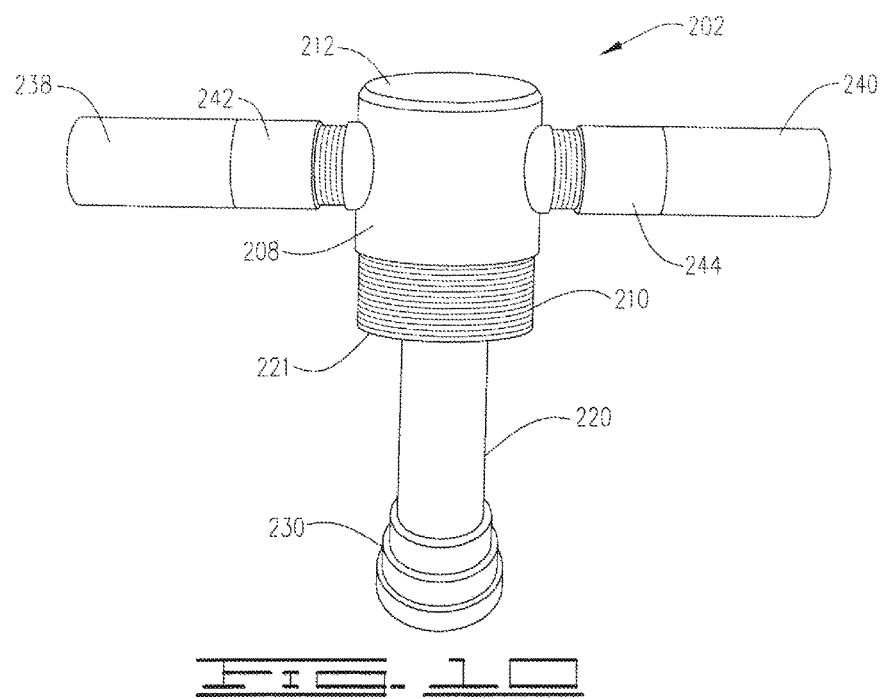
FIG. 10 is an exterior elevational side view of the inventive supply and return header 202.
Figure 11:
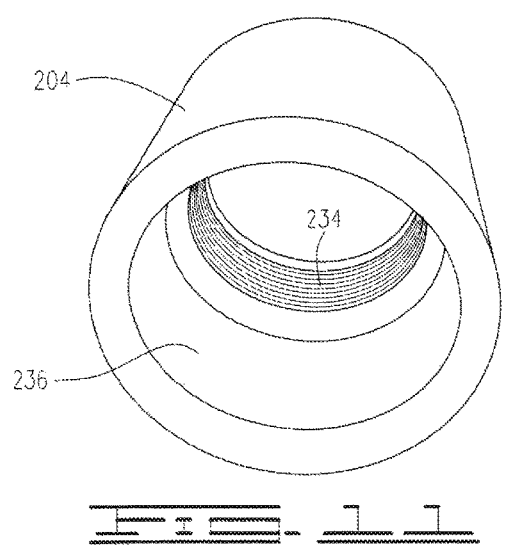
FIG. 11 is a bottom perspective view of a socket-to-thread adaptor 204 used for attaching the inventive supply and return header 202 to the upper end of the ground heat exchange assembly casing 206.

An embodiment 202 of the improved supply and return header provided by the present invention is illustrated in FIGS. 9, 10, and 12. An embodiment 200 of an improved concentric ground exchange assembly having the inventive supply and return header 202 installed thereon is illustrated in FIG. 9.

The inventive supply and return header 202 comprises: an upper housing 208 which preferably has a cylindrical "can" shape with exterior threads 210 provided around the lower end portion thereof a flat top plate 212 which seals the upper end of the housing 208 and defines the upper end of the header assembly 202; a threaded inlet port 214 provided laterally through the vertical cylindrical wall 216 of the housing; a threaded outlet port 218 which is also provided laterally through the vertical cylindrical housing wall 216, most preferably at a location in the range of from 90 to about 180 degrees from the inlet port 214; and an interior feed conduit 220. The interior feed conduit 220 extends horizontally from the inlet port 214 toward the interior center of the housing 208 to an internal elbow 225. The internal elbow 225 directs the remainder of the interior feed conduit 220 vertically downward toward, and preferably through, the bottom end 221 of the cylindrical housing 208 for attachment to the inner conduit 222 of the concentric ground exchange assembly 200.

Although other materials can be used, the header housing 208 and the interior feed conduit 220 are preferably formed of brass or stainless steel and are most preferably formed of 304 stainless steel. To absorb the tensile stress produced by the weight of the attached inner conduit 222 of the exchange assembly, the upper horizontal end 224 of the interior feed conduit 220 is preferably welded to the cylindrical wall 216 of the housing 208 at the inlet port 214. Alternatively, or in addition, the upper horizontal portion 224 of the interior feed conduit 220 can be welded to the interior bottom surface of the housing top plate 212. The lower end of the interior feed conduit 220 is preferably connected to the upper end of the exchange assembly inner conduit 222 using a coupling or other structure 230 having interior threads which are received on corresponding threads 232 provided around the upper end portion of the exchange assembly inner conduit 222.

The inventive supply and return header 202 is preferably secured on the upper end of the exchange assembly casing 206 using a socket-to-thread adaptor 204. Although other materials can also be used, the socket-to-thread adaptor 204 is preferably formed of fiberglass and includes: (a) an upper interior threaded portion 234 which is received on the lower exterior threaded portion 210 of the housing 208 and (b) a smooth cylindrical lower interior portion 236 which corresponds to and is received on the upper end of the casing 206. The socket-to-thread adaptor 204 is preferably secured and hermetically sealed around the upper end portion of the casing 206 by chemically fusing the lower cylindrical interior portion 236 of the adaptor 204 directly to the exterior cylindrical wall of the casing 206 using an adhesive or other bonding material which is compatible with both the composition of the adaptor 204 and the composition of the casing 206.

The socket-to-thread adaptor 204 is preferably formed by first mixing liquid epoxy resin, an aromatic amine hardener, and chopped glass strands in an industrial mixer to form a "prepreg." The prepreg mixture is then press molded under heat and pressure to form the finished part. An example of a commercially available fitting which is well suited for use in the present invention is a Fiber Glass Systems 29S threaded adaptor, preferably not having any hand lay-up overwrap applied on the molded body of the fitting.

The heat transfer working fluid feed line 238 and return line 240 are typically formed of a plastic such as high density polyethylene and extend horizontally underground toward and away from the ground exchange assembly header 202. Consequently, as mentioned above, the feed line 238 and return line 240 are commonly referred to as "laterals." To accommodate the different expansion and contraction characteristics of the plastic laterals 238, 240 and the preferred stainless steel header housing 208, the feed and return laterals 238 and 240 are preferably secured to the header inlet and outlet ports 214 and 218 using connectors 242 and 244. The connectors 242 and 244 are preferably formed of stainless steel and each has an externally threaded first end 246 which is threadedly received in the appropriate inlet or outlet port 214 or 218 and a threaded second end 248 to which the feed lateral 238 or return lateral 240 is threadedly connected. Adhesives are also preferably used for sealing the connections between the connectors 242 and 244 and the inlet and outlet ports 214 and 218 and between the connectors 242 and 244 and the feed and return laterals 238 and 240.

As an alternative to the use of a socket-to-thread adaptor 204, it will be understood that cylindrical can housing 208 can be sized and the lower portion extended as needed to allow the housing itself to be placed on the upper end of the casing 206 and directly bonded thereto as illustrated in FIG. 14. In order to enhance the direct bond and seal between the housing 208 and the casing 206 in the embodiment of FIG. 14, a series of interior tiers 235 of decreasing diameter from the bottom up will preferably be formed in the lower portion of the can housing 208.

Figure 15:
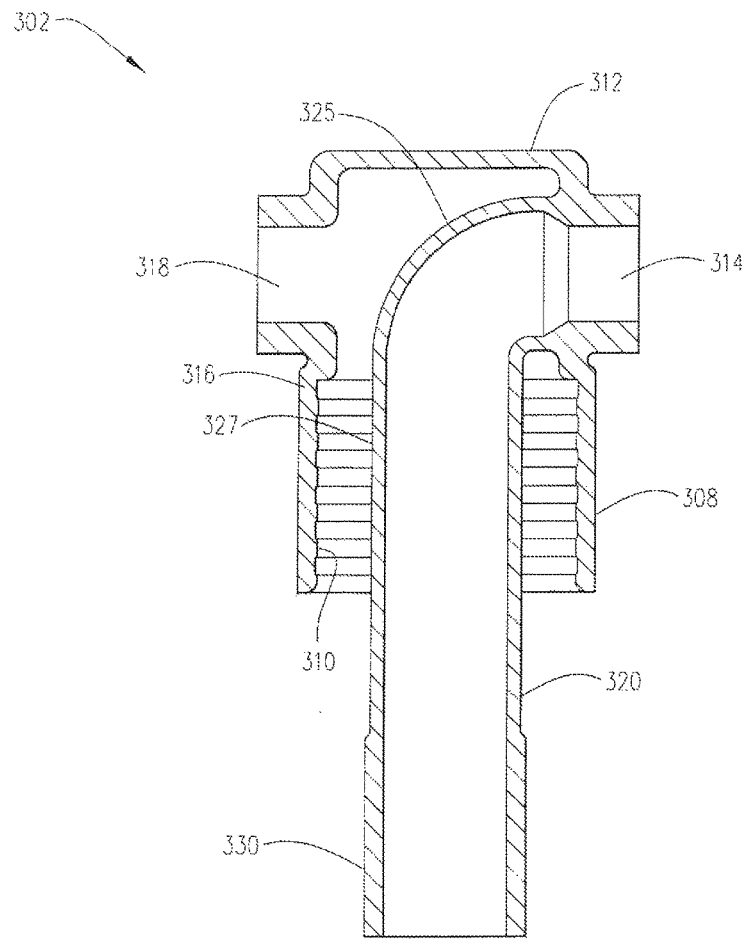
FIG. 15 is a cutaway vertical view of an alternative cast embodiment 302 of the inventive supply and return header.

An alternative embodiment 302 of the inventive supply and return header is depicted in FIG. 15. The inventive header 302 is similar to the inventive header 202 except that the inventive header 302 is a unitary cast structure. Examples of materials suitable for forming the inventive cast header 302 include, but are not limited to, stainless steel or a fiberglass composite. The inventive header 302 is preferably formed of 304 stainless steel.

The inventive cast header 302 comprises: an outer housing 308 preferably having a cylindrical can shape with a substantially flat upper end 312 and a smooth cylindrical or tiered (or grooved) lower end 310 sized to be received on, and chemically bonded directly to, the upper end of the casing 206; an inlet port 314 projecting laterally from the vertical cylindrical wall 316 of the housing and optionally having threads cut in the interior thereof for threadedly receiving the inlet lateral or an inlet compression fitting; an outlet port 318 projecting laterally from the housing wall 316 and optionally having threads cut in the interior thereof for receiving the outlet lateral or an outlet compression fitting; and an interior feed conduit 320.

The interior conduit 320 formed in the cast structure 302 comprises: (a) an upper portion which extends horizontally from the housing inlet 314 and has an internal elbow 325 at the distal end thereof and (b) a vertical discharge portion 327 which preferably extends from the internal elbow 325 through the bottom end of the outer housing 308. Interior threads can also optionally be cut in the lower end portion 330 of interior conduit 320 for either directly threadedly receiving the upper end of the inner conduit of the ground exchange system or threadedly receiving an attachment fitting for the ground exchange inner conduit.

As with the inventive header 202, appropriate adhesives or other bonding agents will also preferably be used with the inventive cast header 202 to further seal, bond, and secure all of the threaded direct or threaded fitting attachments between the header 302 and the feed and return laterals and the ground heat exchange inner conduit.

In addition, it will also be understood that: (a) external rather than internal threads could alternatively be cut into the cast header 302 for use in some or all of the various threaded attachments, (b) rather than cutting threads in the cast header 302, some or all of the various threaded attachments could alternatively be replaced with smooth, grooved, or tiered bore direct adhesive attachments, and/or (c) rather than bonding the header housing 308 directly on the upper end of the ground system casing, threads could alternatively be cut around the exterior of the cast header housing 308 for attachment to the upper end of the casing using a socket-to-thread adaptor in the same manner as described above for inventive header 202.

In the inventive concentric ground exchange assembly 200, as illustrated in FIG. 14, the casing 206 can be any type of casing suitable for use in ground exchange assemblies and will preferably comprise an string assembly of fiber reinforced composite casing segments as described above. The composite casing segments will preferably be formed of a thermoplastic material, most preferably epoxy, which is reinforced with fiberglass, carbon fiber, aramid fiber, or a combination thereof. In addition, the casing segments will preferably be formed by filament winding and will also preferably include at least 1.5% by weight of a thermal conductivity enhancing additive such as aluminum flake, aluminum powder, aluminum oxide, aluminum nitride, graphite, boron nitride, silicone carbide, Raney nickel, silver-coated nickel, silver-coated copper, or a combination thereof. An example of a commercially available adhesive material which is well suited for bonding the preferred fiberglass socket-to-thread adaptor 204, the stainless steel housing 208, or the cast stainless header 302 to a casing 206 of this type is WELDFAST® ZC-275 epoxy adhesive available from Fiber Glass Systems.

An example of a commercially available adhesive which is well-suited for use in sealing the attachment between the materially different HDPE inlet and return laterals 238 and 240 and the stainless steel header connectors 242 and 244 is PLEXUS® MA830 methacrylate adhesive available from ITW PLEXUS.

The inner conduit 222 employed in the inventive concentric ground heat exchange assembly 200 can be any type of inner pipe or other conduit used in concentric ground heat exchange assemblies but, as discussed above, will preferably be a corrugated plastic or rubber drop tube having a continuous series of circular radial ribs 44, 250 provided on the exterior thereof as illustrated in FIGS. 6 and 9. The corrugated inner drop tube 222 will most preferably be formed of high density polyethylene, PVC, or EPDM (i.e., a terpolymer elastomer produced from ethylene-propylene diene monomer).

Because the 90° bend 235 or 325, which directs the horizontal flow from the feed lateral 238 into the vertical exchange assembly inner conduit 222, is located within the housing 208 or 308 of the inventive supply and return header 202 or 302, the height of the inventive supply and return header 102 can be as little as 5.25 inches or less, as compared to a typical height of from 16 to 20 inches or more for the prior art header 12 described above. This significantly reduces the amount of trenching and digging required for the assembly and installation of the inventive concentric ground exchange assembly 200. In addition, the inventive supply and return header 202 or 302 provides a secure, hermetically sealed connection with the assembly casing 206 which eliminates the need for flanges, flange rings, bolts, nuts, washers, and gaskets. Further, the stainless steel materials preferred for use in forming the inventive supply and return header 202 or 302 are also commonly used with great success in other underground applications such as water wells and do not present any regulatory difficulties or concerns.

Thus, the present invention is well adapted to carry out the objectives and attain the ends and advantages mentioned above as well as those inherent therein. While presently preferred embodiments have been described for purposes of this disclosure, numerous changes, adaptations, and modifications will be apparent to those of ordinary skill in the art. Such changes, adaptations, and modifications are encompassed within this invention as defined by the claims.

What is claimed is:

1. A method of ground heat exchange comprising the steps of:
   a) delivering a heat transfer fluid to an assembly for subterranean heat exchange comprising (i) a casing which extends downwardly into the ground, (ii) a supply and return header to which the heat transfer fluid is delivered, the supply and return header being positioned on an upper end of the casing, (iii) a corrugated tubing which extends downwardly in the casing from the supply and return header, and (iv) a return flow annulus formed between the corrugated tubing and an interior wall of the casing, wherein the corrugated tubing has a corrugated exterior which projects outwardly into the return flow annulus toward the interior wall of the casing;
   b) flowing the heat transfer fluid downwardly through an interior flow channel of the corrugated tubing; and then
   c) flowing the heat transfer fluid upwardly through the return flow annulus over the corrugated exterior of the corrugated tubing which projects toward the interior wall of the casing to induce turbulence in the return flow annulus at the interior wall of the casing which disrupts a thermal boundary layer of the heat transfer fluid on the interior wall of the casing for heat transfer through the casing between the heat transfer fluid in the return flow annulus and an underground environment surrounding the casing,
   wherein the corrugated exterior of the corrugated tubing comprises corrugation valleys and
   in step (c), the flowing of the heat transfer fluid upwardly through the return flow annulus is performed at a rate which prevents disruption of a thermal boundary layer of the heat transfer fluid on an exterior of the corrugated tubing in the corrugation valleys.

2. The method of claim 1 wherein the corrugated tubing has a J thermal conductivity value of less than 0.2 Btu/hr-ft-°F.

3. The method of claim 1 wherein a ratio of outside diameter to inside diameter of the corrugated tubing in the corrugation valleys is at least 1.2.

4. The method of claim 1 wherein a cross-sectional area of the return flow annulus in the corrugation valleys is greater than a cross-sectional area of the interior flow channel of the corrugated tubing.

5. The method of claim 1 wherein an inner surface of the interior flow channel of the corrugated tubing is smooth.

6. The method of claim 1 wherein the supply and return header on the upper end of the casing is entirely buried underground.

7. A method of ground heat exchange comprising the steps of:
   (i) delivering a heat transfer fluid to an assembly for subterranean heat exchange comprising (i) a casing which extends downwardly into the ground, (ii) a supply and return header to which the heat transfer fluid is delivered, the supply and return header being positioned on an upper end of the casing, (iii) a corrugated tubing which extends downwardly in the casing from the supply and return header, and (iv) a return flow annulus formed between the corrugated tubing and an interior wall of the casing, wherein the corrugated tubing has a corrugated exterior which projects outwardly into the return flow annulus toward the interior wall of the casing;
   (b) flowing the heat transfer fluid downwardly through an interior flow channel of the corrugated tubing; and then
   (c) flowing the heat transfer fluid upwardly through the return flow annulus over the corrugated exterior of the corrugated tubing which projects toward the interior wall of the casing to induce turbulence in the return flow annulus at the interior wall of the casing which disrupts a thermal boundary layer of the heat transfer fluid on the interior wall of the casing for heat transfer through the casing between the heat transfer fluid in the return flow annulus and an underground environment surrounding the casing,
   wherein the supply and return header on the upper end of the casing is entirely buried underground and
   the supply and return header comprises:
   a housing having a closed top and a vertically extending outer wall which surrounds an interior of the housing, the closed top defining an upper end of the supply and return header;
   a supply port for the heat transfer fluid provided through the vertically extending outer wall below the closed top of the housing, the supply port having a horizontally extending fluid supply conduit connected thereto underground which delivers the heat transfer fluid to the supply and return header;
   a return port for the heat transfer fluid provided through the vertically extending outer wall below the closed top of the housing, the return port having a horizontally extending fluid return conduit connected thereto underground; and
   an interior supply conduit having (i) a first portion of the interior supply conduit which extends into the interior of the housing from the supply port and has a bend which is positioned in the interior of the housing which directs the heat transfer fluid downwardly and (ii) a second portion of the interior supply conduit which extends downwardly from the bend in the interior of the housing to deliver the heat transfer fluid to the interior flow channel of the corrugated tubing.

8. The method of claim 7 wherein the housing, the supply port, the return port, and the interior supply conduit of the supply and return header are integrally formed as a unitary structure.

9. The method of claim 7 wherein the closed top of the housing has a substantially flat upper exterior surface.

10. The method of claim 7 wherein the housing of the supply and return header has a lower interior portion in which the upper end of the casing is received, without threaded attachment, and the lower interior portion of the housing is directly bonded to the upper end of the casing.

11. The method of claim 7 wherein the fluid supply and return conduits are connected to the supply and return ports of the housing of the supply and return header using stainless steel connectors.

* * * * *

UNITED STATES PATENT AND TRADEMARK OFFICE
CERTIFICATE OF CORRECTION

PATENT NO. : 10,301,528 B1
APPLICATION NO. : 15/810653
DATED : May 28, 2019
INVENTOR(S) : Lane Lawless et al.

Page 1 of 1

It is certified that error appears in the above-identified patent and that said Letters Patent is hereby corrected as shown below:

In the Claims

Claim 2, Column 23, Line 37: Delete the "J" after the wording "has a"

Signed and Sealed this
Thirtieth Day of July, 2019

Andrei Iancu
*Director of the United States Patent and Trademark Office*